United States Patent [19]

Cameron

[11] Patent Number: 5,455,873
[45] Date of Patent: Oct. 3, 1995

[54] FACSIMILE DYNAMIC THRESHOLDING APPARATUS AND METHOD OF USE THEREOF

[75] Inventor: Dan Cameron, Jr., Woodland Hills, Calif.

[73] Assignee: Information International, Inc., Los Angeles, Calif.

[21] Appl. No.: 621,018

[22] Filed: Dec. 3, 1990

[51] Int. Cl.[6] .................................................. G06K 9/38
[52] U.S. Cl. .......................... 382/270; 358/466; 358/447; 358/455
[58] Field of Search .................... 358/447, 445, 358/455, 457, 465, 456, 213.15, 213.16, 466; 382/50, 51, 52, 53, 27, 54; 348/801, 800

[56] References Cited

U.S. PATENT DOCUMENTS

| | | |
|---|---|---|
| 4,266,249 | 5/1981 | Chai et al. ............................. 358/429 |
| 4,345,314 | 8/1982 | Melamud et al. ....................... 358/447 |
| 4,509,195 | 4/1985 | Nadler ..................................... 358/447 |
| 4,720,745 | 1/1988 | DeForest et al. ....................... 358/447 |
| 4,731,862 | 3/1988 | Tsuda et al. ............................ 358/465 |
| 4,742,399 | 5/1988 | Kitamura ................................. 358/466 |
| 5,097,520 | 3/1992 | Bessho et al. ........................... 382/51 |

*Primary Examiner*—Wing F. Chan
*Assistant Examiner*—Ping W. Lee
*Attorney, Agent, or Firm*—Arthur Freilich; Freilich, Hornbaker & Rosen

[57] ABSTRACT

A facsimile system for scanning a graphic image to produce a stream of output bits representative of an m×n array of picture elements of the image, each output bit being corrected to compensate for the average tone of a subarray of surrounding picture elements. The average tone is measured by a count of those gray levels, representative of the picture elements of the subarray, that exceed a nominal threshold. Thus the tone of the subarray dynamically adjusts the threshold of the gray level to output bit conversion of each picture element.

5 Claims, 3 Drawing Sheets

FACSIMILE DYNAMIC THRESHOLDING APPARATUS AND METHOD OF USE THEREOF

FIELD OF INVENTION

The present invention relates to facsimile systems for scanning and recording of graphic arts quality images.

BACKGROUND OF THE INVENTION

In the printing industry, it is often desirable to move a premanufactured graphic image from one location to another. Modern facsimile system technology provides the capability of scanning an image at one location and transmitting the resulting data to another location for printing.

The original graphic image may be comprised of a number of components assembled on a photographic medium, e.g. film or paper, as they are to appear on a final printed page.

The various components that might be present in a graphic image are:

1. Type, primarily comprising alphanumeric characters.
2. Line art, typically line illustration, and rules composed of black and white linework, or patterns of various complexity.
3. Halftone illustrations representative of continuous tone images which reproduce the gray levels of an image with patterns of dots of varying area.

A typical prior art facsimile system causes an illumination spot to scan the prepared graphic image to produce a stream of binary (either black or white) picture elements which are then transmitted to a receiver/recorder for subsequent printing. Such facsimile systems are well known and generally include the following:

1. The original medium to be scanned, transmitted, and recorded. This is usually a photographic medium of very high contrast which can be film based either with black elements on a transparent background (positive), or clear elements on a black background (negative), or paper based (reflection) with black elements on a white reflective background.
2. The scanning subsystem, consisting of a light source to illuminate the image, a photosensing device to capture the transmitted or reflected light, and a single level threshold (usually adjustable) that simply puts out binary white bits for light levels above the threshold and black bits for light levels beneath.
3. The transmission system, which is typically some form of communications link between the scanning subsystem and the output/recorder subsystem. This can be as simple as a direct wire connection, or as complex as satellite transmission with various compression/decompression schemes applied to the data stream.
4. The output/recorder subsystem, typically a binary imaging system capable of exposing or not exposing each picture element on a piece of film or paper in an exact one to one relationship with the original scanned image.

Facsimile systems suitable for use in the graphic arts/printing industry encounter far more stringent requirements than relatively low resolution facsimile systems used in a typical office environment. For example, a graphic arts facsimile system, is required to capture the finest serifs on very small type and faithfully reproduce all of the gray levels represented in halftone dots which can contain picture elements of 0.001" or less. That is, in order to maintain gray level fidelity and color balance, all halftone dots must be reproduced at precisely the same size as in the original image.

The faithful reproduction of graphic images, and particularly halftone dots, has presented a significant challenge, due in part to the limitations of the scanning subsystem. Some of those limitations are attributable to the basically Gaussian shape of the sampling spot. That is, the Gaussian shape of the spot permits neighboring picture elements, around the element being sampled, to influence and distort the binary black/white decision made with respect to the sampled picture element. The result of this distortion is the loss of information needed to faithfully reproduce the original image, most noticeable in halftone dot growth or dropout. For example, scanner limitations typically cause 95% halftone dots to grow and appear totally black and 5% halftone dots to dropout and appear totally white. This shifts the gray level or color balance of the image and causes loss of subtle detail.

Prior efforts have been made to eliminate these and other sources of distortion; e.g., see U.S. Pat. No 4,501,016 and U.S. Pat. No. 4,926,267. Other patents of interest are U.S. Pat. No. 4,597,009, U.S. Pat. No. 4,723,173, U.S. Pat. No. 4,742,399, U.S. Pat. No. 4,829,587, U.S. Pat. No. 4,903,143. U.S. Pat. No. 4,905,294, U.S. Pat. No. 4,908,875, and U.S. Pat. No. 4,953,114.

SUMMARY OF THE INVENTION

The present invention is directed to facsimile apparatus for scanning a graphic image to produce a stream of output bits representative of an m×n array of picture elements of the image, each output bit being corrected to compensate for the tone of a subarray of surrounding picture elements.

Apparatus in accordance with the invention dynamically adjusts the threshold for determining the output bit associated with each picture element based upon the average tone of a subarray surrounding that picture element. The average tone is measured by a count of those gray levels, representative of the picture elements of the subarray, that exceed a nominal threshold. Thus the tone of the subarray dynamically adjusts the threshold of the gray level to output bit conversion of each picture element.

In a preferred embodiment of the invention, the gray level of each scanned picture element is initially represented by a multibit digital word adjusted so that its most significant bit indicates whether it is above or below nominal black/white threshold. The average tone of a subarray is determined by counting the most significant binary "1" bits of the digital word representing the subarray.

Each multibit word representing a gray level value, together with the count representing the average tone (i.e. "area average") of the surrounding subarray, is used to address a look up table to access a corresponding output bit. The look up table is preferably implemented in a programmable memory to enable the influence of the area average on the gray level to output bit conversion to be varied. That is, different functions can be programmed into the memory to compensate, for example, for the material being scanned, the characteristics of the scanner, and the characteristics of the recorder. In accordance with a further significant feature of the preferred embodiment, the count of the binary ones in the subarray is developed by a plurality of shift registers implemented to represent a subarray.

A chain of line buffers is used to supply the most significant bits to the shift registers. The outputs of the shift register drive up/down counters which develop a count of the number of binary "1"'s in the subarray.

The novel features of the invention are set forth with particularity in the appended claims. The invention will be best understood from the following description when read in conjunction with the accompanying drawings.

DETAILED DESCRIPTION

Figure 1:
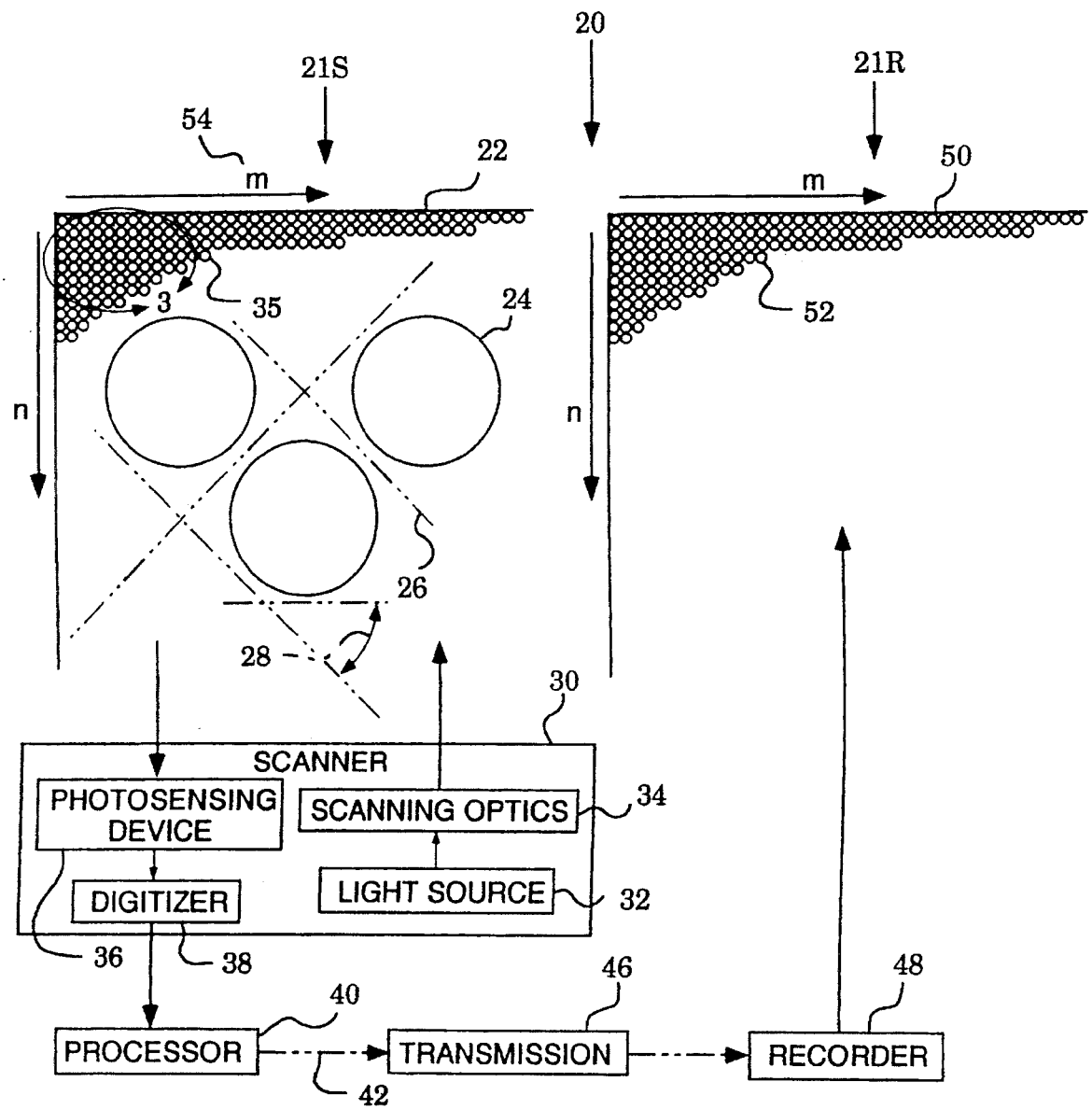
FIG. 1 schematically depicts a typical facsimile system.

FIG. 1 illustrates a typical facsimile system 20 for electronically moving a premanufactured graphic image 22 from a scanning station 21S to a recording station 21R. The graphic image 22 typically contains type, line art and/or halftone illustrations which represent continuous tone images by patterns of halftone dots 24 of varying sizes. The halftone dots 24 are typically arranged along screen lines 26 oriented at some angle 28 relative to the graphic image 22.

A scanner 30 includes a light source 32 for producing an illumination spot. Scanning optics 34 causes the illumination spot to raster scan the image 22 to sequentially illuminate an m×n array of picture elements (pixels) 35. The graphic image 22 is typically formed on a photographic medium, e.g. transparent film or opaque paper. The light from the illumination spot transmitted through or reflected from the graphic image is detected by a photosensing device 36, its intensity being indicative of the gray level of the illuminated pixel 35. Digitizer 38 produces a multibit digital word (e.g. 8 bits) representative of the gray level of the illuminated pixel 35. Processor 40 converts each multibit word to a single bit, producing a bit stream 42 in which each bit represents a pixel 35 of the graphic image 22 as being either black or white.

The bit stream 42 is sent by some form of electronic transmission 46 to a recorder 48 at the recording station 21R resulting in a reproduction 50 of the scanned image 22. Each scanned pixel 35 of the scanned image 22 is recorded as a pixel 52 on the reproduction 50.

Figure 2:
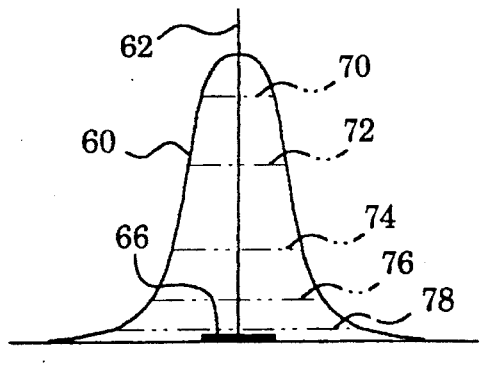
FIG. 2 is a graph depicting the Gaussian light intensity distribution of a typical scanner illumination spot.
Figure 3:
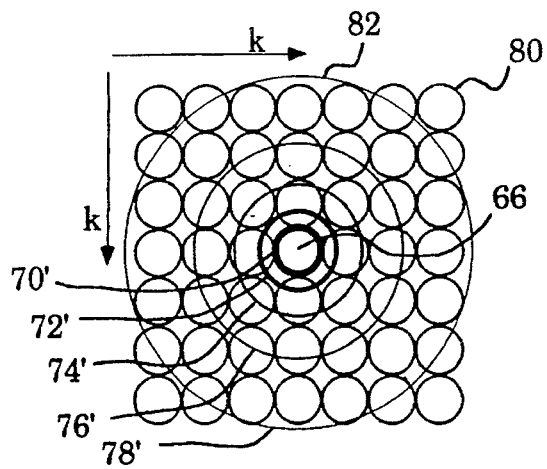
FIG. 3 is an enlarged view of the area enclosed by the line 3 of FIG. 1.

Ideally, the scanning illumination spot produced by light source 32 will precisely illuminate one and only one pixel at a time. In fact, however, as a practical matter, the illumination spot has a two dimensional Gaussian characteristic as represented in FIGS. 2 and 3. That is, the light intensity 60 diminishes as a function of distance from the centerline 62 of the illumination spot. As a consequence, the transmitted or reflected light detected by the photosensing device 36 will be spuriously influenced by a subarray of pixels surrounding the central illuminated pixel, designated 66 in FIGS. 2 and 3.

Figure 4:
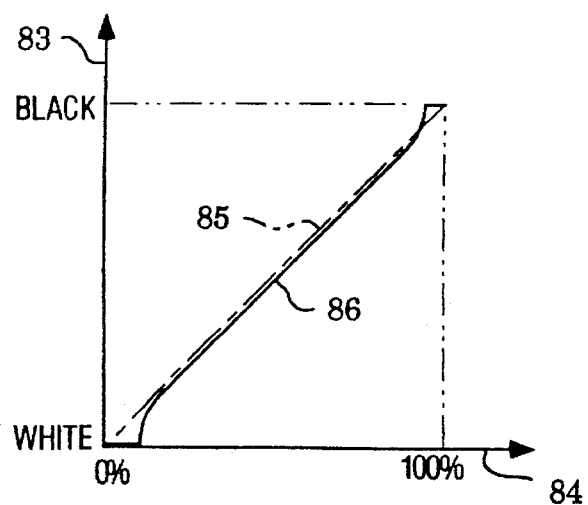
FIG. 4 is a graph showing scanner output as a function of input halftone dot percentage for an ideal and typical prior art scanner.
Figure 6:
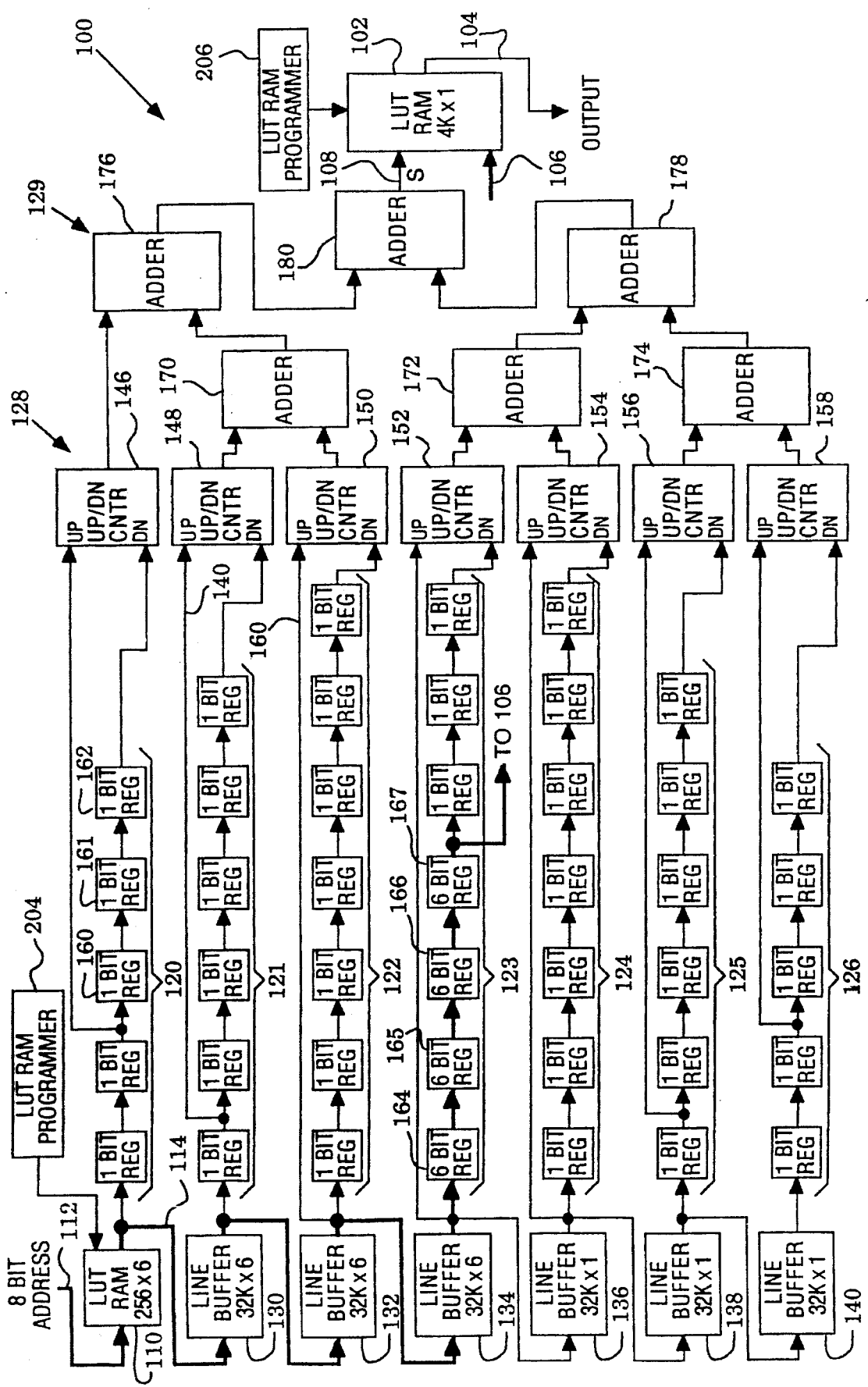
FIG. 6 is a block diagram of a preferred processor with the current invention in accordance with the current invention.

The present invention is primarily directed to improvements in the processor 40 designed to compensate for the spurious influence of the subarray of pixels surrounding each scanned pixel. A preferred processor embodiment in accordance with the invention is depicted in FIG. 6. Applicants improved processor 40 facilitates a more faithful reproduction 50 of the scanned image 22 without loss of fine detail. Parenthetically, FIG. 4 roughly depicts the improved performance attributable to the present invention. The vertical axis 83 (output) in FIG. 4 represents the gray level (from white to black) of a halftone dot formed on the reproduction 50. The horizontal axis 84 (input) depicts varying percentage (from 0% to 100%) halftone dots in the scanned image 22. An ideal facsimile response is represented by line 85 which linearly relates halftone output to halftone input. The response of known prior art systems, however, is more usually characterized by response plot 86 which deviates from the ideal response 85 at its extremes, e.g. above 95% and below 5% halftone dots. That is, it is typical for systems to exhibit both halftone dot growth, i.e. reproducing 95% and greater dots as all black, and pixel dropout, i.e. reproducing 5% and less dots as all white. A system in accordance with the invention is intended to eliminate this loss in fidelity by achieving a response characteristic more nearly represented by response 85.

FIG. 3 is an enlarged view of the area enclosed by the line 3 of FIG. 1 illustrating a k×k subarray 80 of pixels of the m×n array 54 of pixels of the graphic image 22. Superimposed on the subarray 80 is the scanner illumination spot 82 represented by circles of diminishing light intensity 70',72', 74',76', and 78'. These circles correspond to the light intensity levels 70,72,74,76 and 78 depicted in FIG. 2. It can thus be appreciated that the light collected by the photosensing device 36 includes spurious information from the subarray 80 in addition to the desired gray level information from the pixel 66.

The facsimile error evidenced in FIG. 4 due to the scanner spot 82 collecting spurious information is corrected in accordance with the present invention by compensating for the tone or gray level of the subarray within which the pixel 66 lies. A basic 7×7 subarray of pixels P00 . . . P48:

| 00 | 01 | 02 | 03 | 04 | 05 | 06 |
|----|----|----|----|----|----|----|
| 07 | 08 | 09 | 10 | 11 | 12 | 13 |
| 14 | 15 | 16 | 17 | 18 | 19 | 20 |
| 21 | 22 | 23 | 24 | 25 | 26 | 27 |
| 28 | 29 | 30 | 31 | 32 | 33 | 34 |
| 35 | 36 | 37 | 38 | 39 | 40 | 41 |
| 42 | 43 | 44 | 45 | 46 | 47 | 48 |

If the scanner spot profile (assumed to be basically Gaussian) was precisely known, it would be possible to compute a set of weighting factors W00 . . . W48 such that the computation output=W00×P00+W01×P01+. . . +W48×P48 could approximately correct the center value P24 (comparable to pixel 66 of FIG. 3) for the effects of the scanner spacial frequency response.

The amount of hardware needed to accomplish this in real time is probably not economically feasible. Nor is it economically feasible to slow down throughput speed to allow such computations to be performed with a simple hardware configuration or general purpose computer. However, it is typically the case that the errors due to a non-corrected area average are such that the elegance of a true spacial filter is not required to reduce the errors to an acceptable level.

In accordance with an embodiment of the current invention, the scanner gain and offset are adjusted so that all pixel gray level values in the m×n array 54 of FIG. 1 are centered about the 50% input level. They are then centered about a level which, in absence of dynamic thresholding adjustment in accordance with the invention would be the fixed or nominal level for thresholding. Under this condition the most significant bit of each gray level binary word representing a scanned pixel would be the appropriate output of processor 42 for use in the reproduction 50 of FIG. 1.

With a different set of weighting factors, the expression previously given can be written as:

$$S = W00 \times P00 + W01 \times P01 + \ldots + W48 \times P48$$

where S is a measure of the average tone of the subarray and the corrected output for the center pixel P24 (66 in FIG. 3) can be written:

$$\text{Corrected output} = P24 - S$$

In accordance with a preferred embodiment of the invention, the term S is approximated by assuming all weighting factors W00 ... W48 to be 1 and the pixel gray words are truncated to their most significant bit. Thus, S is developed simply as a count of how many pixels in the subarray are above the fixed or nominal threshold.

A simple way to utilize the term S so produced is to form $$\text{output} = P24 - K \times S, \text{ where K is a constant,}$$

and use the most significant bit of output as the binary output. There are two problems with this approach. One is that for square halftone dots the response varies as a function of screen angle. This is undesirable, but this problem would go away if our array were round instead of square. A round array can be sufficiently approximated by taking our square array and eliminating corner elements as below:

|    |    | 02 | 03 | 04 |    |    |
|----|----|----|----|----|----|----|
|    | 08 | 09 | 10 | 11 | 12 |    |
| 14 | 15 | 16 | 17 | 18 | 19 | 20 |
| 21 | 22 | 23 | 24 | 25 | 26 | 27 |
| 28 | 29 | 30 | 31 | 32 | 33 | 34 |
|    | 36 | 37 | 38 | 39 | 49 |    |
|    |    | 44 | 45 | 46 |    |    |

The other problem with the implementation as $$\text{output} = P24 - K \times S$$

is that the approximations in forming S are just too severe to provide sufficient dot error correction over the full range of dot percentages. Consider the simple fact that for a given input dot percentage, a threshold could be chosen that would make the output dot percentage correct, but only for that one specific dot percentage. Consider further that when a pixel on the edge of a halftone dot is being thresholded the quantity S is a count of the number of pixels in the surrounding area which are above a fixed threshold. This is a measure, only approximate and generally nonlinear of what the dot percentage is. Thus, the dynamic threshold equation in accordance with the invention is written as $$\text{output} = P24 - f(S),$$

where f (S) is an arbitrary function.

In accordance with applicants preferred embodiment, the function f(S) is implemented utilizing a programmable memory (102 in FIG. 6) as a simple look up table. That is, the digital word representative of the gray level value of P24 and the count representative of S are used to address a one bit random access memory whose output constitutes the thresholded binary output of processor 42.

The function f(S) depends on the characteristics of the scanner and recorder as well as the granularity of the scan and the mesh and type of halftone screen. In our implementation of this approach, the function has been determined experimentally, using input media with known calibration wedges.

Figure 5:
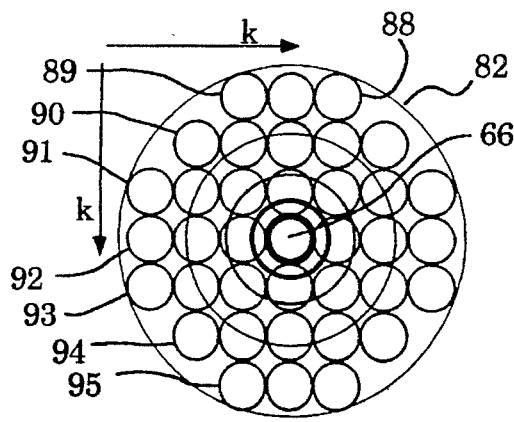
FIG. 5 is a view similar to FIG. 3 but showing a preferred subarray used in accordance with the invention to compensate for the tone of surrounding picture elements.

FIG. 5 illustrates a subarray 88 of pixels, representative of that depicted above, and including in rows 89,90,91,92,93, 94,95, three, five, seven, seven, seven, five, three pixels respectively. As previously, the center pixel is designated 66.

FIG. 6 is a block diagram of an embodiment 100 of the processor 40 implementing the subarray 88 of FIG. 5. A look up table random access memory 102 provides a binary output 104 responsive to a six bit address 106 representing the gray level of the center pixel 66 of subarray 88 (FIG. 5) and a six bit address 108 representing the count of pixels in the subarray 88 that have gray levels over a predetermined fixed threshold.

The predetermined fixed threshold is established for the scanned m×n array 54 of pixels (FIG. 1) in a look up table implemented by random access memory 110. Eight bit gray levels from the scanner 30 in FIG. 1 address the memory 110 and scaled and offset six bit gray levels are accessed at output 114. The result of this operation is to shift the gray level of the scanned graphic about a 50% gray level threshold. Thus gray levels at the output 114 above the threshold have a binary "1" as their most significant bit.

The count S is simply developed in the implementation of FIG. 6 by utilizing strings of shift registers 120,121,122, 123,124,125,126, corresponding respectively to rows 89,90, 91,92,93,94,95 of subarray 88 (FIG. 5). The shift registers are loaded with the most significant bits of the gray level values of the subarray 88 pixels and arithmetic means comprised of counter 128 and adder 129 are employed to count the number of binary "1"'s in the subarray. This count is delivered at address input 108 of memory 102.

More specifically, the most significant bits of the six bit gray levels sequentially delivered at output 114 are fed into shift register string 120. The full six bit gray levels from output 114 are sequentially loaded into line buffer 130 depicted as having a capacity of 32 K×6 bits. Thus line buffer 130 has a capacity to store six bit gray levels for 32000 pixels, i.e. one line of the m×n array. The most significant bits output from line buffer 130 supply shift register string 121. The six bit output from line buffer 130 is daisy chained through line buffers 132,134. Buffer 132 outputs most significant bits to shift register string 122. Buffer 134 outputs six bit words to shift register string 123 from which the six bit gray level for center pixel P24 is taken at 106.

Buffer 134 outputs most significant bits through daisy chained buffers 136,138,140 which respectively drive shift register strings 124,125, 126.

To count the binary "1"'s of the subarray 88, a plurality of up/down counters 146,148,150,152,154,156,158 are respectively associated with shift register strings 120,121, 122,123,124,125,126, corresponding respectively to subarray rows 89,90,91,92,93,94,95. Each counter is connected so as to be incremented and decremented respectively in response to binary "1"'s being applied to its up port and down port. The counters ignore applied binary "0"'s. The up and down ports of each counter are connected to shift register outputs of its associated string so as to count the number of "1"'s entering and exiting from a particular portion of the string. Thus, each counter will maintain a count indicative of the number of "1"'s in that portion of its shift register string corresponding to pixels in the associated subarray row.

As an example, note that the up port of counter 146 is taken from the input to the third shift register 160 of string 120 while its down port is taken from the output of the shift register 162. Thus, counter 146 will maintain a count at all times indicative of the number of binary "1"'s in shift registers 160,161,162 corresponding to the pixels in subarray row 89. Counters 148,150,152,154,156,158 similarly accumulate and maintain counts with respect to their respective shift register strings.

It should be noted that whereas shift register strings 120,121,122,124,125,126 are all comprised of one bit shift registers for handling only the most significant bits of six bit gray levels, string 123 includes six bit shift registers 164, 164,166,167. These six bit shift registers are necessary to carry the full six bit gray level of the center pixel P24 (66 in FIG. 5) to the output of register 167 which supplies the input 106 to memory 102. Only the most significant bit from register 167 is fed through the last three registers of string 123 to the down port of counter 152.

Adders 170,172,174,176,178 and 180 sum the counts of the counters 146,148,150,152,154,156 and 158 and provide this sum as the six bit address 108 to the memory 102 as stated above. This represents the approximate average tone or gray level of the area represented by the subarray.

In operation, once all the line buffers have been filled, further clocking of data begins feeding information into the shift register strings 120–126. As data continues to flow from the scanner into the line buffers, the subarray 88 of FIG. 5 can be visualized to be following the raster scan across and down the graphic 22 of FIG. 1. The counters 128 are reset at the end of each row scan of the m×n array.

A programmer 204 is provided enabling the contents of the random access memory 110 to be modified to select the appropriate function relating the scaled and offset output 114 to the eight bit input 112. Similarly a programmer 206 is able to modify the contents of memory 102 to select the appropriate function relating the binary output 104 to the values of P24 (at 106) and S (at 108).

In use, a known prescreened graphic can be scanned to establish system threshold and gain to yield accurate reproduction of midtone dot area. Then patches of highlight and shadows can be scanned to enable an operator to interactively program look up tables in the memories 102,110 to compensate for inherent system losses, to yield an accurate facsimile of the graphic 22 (FIG. 1) in the reproduction 50 (FIG. 1).

It should be apparent that the embodiment illustrated in FIG. 6 is but one embodiment of the invention. Therefore, although the present invention has been described with reference to such preferred embodiment, numerous modifications and rearrangements can be made with the equivalent result still embraced within the scope of the invention.

What is claimed is:

1. Apparatus for scanning a graphic image to produce a stream of output bits representative of an m×n array of pixels of that image, said apparatus comprising:

light source means for producing an illumination spot;

scanning means for causing said spot to scan n successive lines across said image;

photosensing means for producing a gray level value of said image at each of m pixels across each of said scanned lines; and processor means responsive to each produced pixel gray level value from said photosensing means to generate a single output bit representative thereof, said processor means including:

means for setting a gray level threshold;

means for determining whether the gray level value of each pixel in a subarray of pixels centered about each of said m×n pixels, exceeds said gray level threshold, said determining means comprises programmable memory means for producing a j bit output in response to each i bit word, each j bit output having its most significant bit set to "1" if its gray level value is above said threshold;

counter means for counting the number of pixels with gray level values exceeding said gray level threshold in said subarray of pixels centered about each of said m×n pixels; wherein said counter means counts the "1" bits stored in storing means;

look up table means, responsive to the gray level value of the center pixel and the count corresponding to its subarray, for generating said single output bit;

digitizer means for representing said pixel gray level values by i bit words; and said storing means for storing the most significant bit of each j bit output, wherein said storing means comprises a plurality of shift register strings, each string corresponding to a different subarray row.

2. Apparatus as defined in claim 1 wherein said counter means comprises a plurality of counters, each for counting the most significant "1" bits resident in a different shift register string.

3. Apparatus as defined in claim 2 including adding means for summing the counts developed in said plurality of counters.

4. Apparatus as defined in claim 3 wherein said processor means further comprises a plurality of line buffers, each for storing multibit words produced by said digitizer means corresponding to a different row of said subarray, and means for shifting most significant bits from said line buffer to the corresponding shift register strings.

5. A method of scanning a graphic image to produce a stream of output bits representative of an m×n array of pixels of that image, said method comprising:

producing an illumination spot;

causing said spot to scan n successive lines across said image;

producing multibit words, each representative of the gray level value of said image at m pixels across each of said scanned lines;

processing each produced multibit word to generate a single output bit representative thereof, said processing step including:

setting a gray level threshold for said image;

counting the number of multibit words in the image exceeding said threshold in a subarray of pixels centered about each produced centered multibit word;

generating, in response to each produced multibit word and the count corresponding to its subarray, said single output bit; and offsetting each multibit word in said subarray so as to set its most significant bit to "1" if it is above said threshold, wherein said counting step includes storing said produced multibit words for each row of said subarray in a separate shift register string and counting the difference between "1" bits entering and exiting each string.

\* \* \* \* \*